US010150709B2

(12) United States Patent
Minami et al.

(10) Patent No.: US 10,150,709 B2
(45) Date of Patent: Dec. 11, 2018

(54) JOINED BODY MANUFACTURING METHOD

(71) Applicant: NGK INSULATORS, LTD., Nagoya (JP)

(72) Inventors: Tomoyuki Minami, Handa (JP); Kazuhiro Nobori, Handa (JP); Tetsuya Kawajiri, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 140 days.

(21) Appl. No.: 15/254,035

(22) Filed: Sep. 1, 2016

(65) Prior Publication Data

US 2016/0368829 A1 Dec. 22, 2016

Related U.S. Application Data

(63) Continuation of application No. PCT/JP2015/056526, filed on Mar. 5, 2015.

(30) Foreign Application Priority Data

Mar. 7, 2014 (JP) ................. 2014-044945

(51) Int. Cl.
*C04B 37/02* (2006.01)
*B23K 1/00* (2006.01)
(52) U.S. Cl.
CPC .......... *C04B 37/026* (2013.01); *C04B 37/023* (2013.01); *B23K 1/0008* (2013.01);
(Continued)
(58) Field of Classification Search
USPC ..................................... 228/122.1
See application file for complete search history.

(56) References Cited

U.S. PATENT DOCUMENTS 3,628,234 A * 12/1971 Russell ................. C04B 37/026
228/124.6
4,352,714 A * 10/1982 Patterson .............. H01M 2/065
174/152 GM
(Continued)

FOREIGN PATENT DOCUMENTS

JP 54-064050 5/1979
JP 63-256291 10/1988
(Continued)

OTHER PUBLICATIONS

English Translation of International Preliminary Report on Patentability, International Application No. PCT/JP2015/056526, dated Sep. 22, 2016 (8 pages).

(Continued)

*Primary Examiner* — Devang R Patel
(74) *Attorney, Agent, or Firm* — Burr & Brown, PLLC

(57) ABSTRACT

In a step (a), a guard ring is disposed on a ceramic substrate (a second member) such that one of openings of a through hole of the guard ring is covered with a joint surface of the ceramic substrate. In a step (b), a brazing material made of a metal, a powder made of a material having a smaller thermal expansion coefficient than the brazing material, and a feeding terminal are inserted into the through hole. In a step (c), the brazing material is fused to impregnate the powder with the brazing material to thereby form a joint layer including the brazing material and the powder. In this manner, the joint surface and the joint surface are joined to each other through the joint layer.

6 Claims, 10 Drawing Sheets

(52) U.S. Cl.
CPC .... *C04B 2237/12* (2013.01); *C04B 2237/121* (2013.01); *C04B 2237/343* (2013.01); *C04B 2237/366* (2013.01); *C04B 2237/405* (2013.01); *C04B 2237/60* (2013.01); *C04B 2237/62* (2013.01)

(56) References Cited

U.S. PATENT DOCUMENTS

| | | | | |
|---|---|---|---|---|
| 4,729,504 | A | * | 3/1988 | Edamura .............. B23K 1/0008 228/122.1 |
| 4,835,344 | A | * | 5/1989 | Iyogi ................... H01L 21/4853 174/267 |
| 4,924,033 | A | * | 5/1990 | Iyogi ..................... B23K 35/025 174/152 GM |
| 5,161,908 | A | * | 11/1992 | Yoshida ................ C04B 37/026 228/125 |
| 6,348,273 | B1 | | 2/2002 | Ishikawa et al. |
| 6,390,354 | B1 | | 5/2002 | Makino et al. |
| 2002/0139563 | A1 | * | 10/2002 | Fujii ........................ H01R 4/62 174/117 A |
| 2014/0301769 | A1 | * | 10/2014 | Kinoshita ............ B23K 20/026 403/30 |

FOREIGN PATENT DOCUMENTS

| | | |
|---|---|---|
| JP | 02-006096 | 1/1990 |
| JP | 03-080160 | 4/1991 |
| JP | 11-228245 | 8/1999 |
| JP | 2001-10873 | 1/2001 |
| JP | 3792440 | 7/2006 |

OTHER PUBLICATIONS

International Search Report and Written Opinion dated Jun. 9, 2015 (PCT/JP2015/056526).

* cited by examiner

JOINED BODY MANUFACTURING METHOD

BACKGROUND OF THE INVENTION

1. Field of the Invention

The present invention relates to a method for manufacturing a joined body.

2. Description of the Related Art

In one known method for manufacturing a joined body, a ceramic-made member and a metal-made member are joined to each other through a joint layer. For example, PTL 1 describes a method for joining a ceramic member having a recess to a metal member having a protrusion. In the joining method in PTL 1, first, a particulate material is spread over the recess of the ceramic member, and a brazing material is disposed on the particulate material. Then the protrusion of the metal member is inserted into the resulting recess. Next, the brazing material is fused to impregnate the particulate material with the brazing material. A joint layer composed of the brazing material and the particulate material is thereby formed, and the ceramic member and the metal member are joined to each other through the joint layer. This joining method is used, for example, for a susceptor for semiconductors such as an electrostatic chuck when metallic feeding terminals for energizing electrodes embedded in a ceramic-made substrate are joined to the ceramic-made substrate.

CITATION LIST

Patent Literature

PTL 1: JP 3792440 B

SUMMARY OF INVENTION

The joining method described in PTL 1 utilizes the recess of the ceramic member to join the metal member and is therefore not suitable for, for example, joining the metal member to the ceramic member at its flat portion with no recess. Specifically, suppose that the joining method described in PTL 1 is used. In this case, when the particulate material is disposed on a flat ceramic member, the particulate material spreads over the surface of the ceramic member, so that the metal member cannot be joined appropriately.

The present invention has been made to solve the foregoing problem, and it is a principal object to allow a joined body including a ceramic-made first member and a metal-made second member joined to the first member to be produced irrespective of whether or not the first member has a portion rising from its joint surface.

The joined body manufacturing method of the present invention is a method for manufacturing a joined body in which a joint surface of a first member made of a ceramic and a joint surface of a second member made of a metal are joined to each other through a joint layer, the method comprising the steps of:

(a) disposing an insertion jig having a through hole into which the second member is insertable on the first member such that one of openings of the through hole is covered with the joint surface of the first member;

(b) disposing, inside the through hole, a brazing material including a metal having a larger thermal expansion coefficient than the first member, a powder of a material having a smaller thermal expansion coefficient than the brazing material, and the second member; and (c) fusing the brazing material to impregnate the powder with the brazing material to thereby form a joint layer including the brazing material and the powder, whereby the joint surface of the first member and the joint surface of the second member are joined to each other through the joint layer.

In the joined body manufacturing method of the present invention, when the ceramic-made first member and the metal-made second member are joined to each other, the insertion jig having the through hole is disposed on the first member. In this case, the insertion jig is disposed on the first member such that one of the openings of the through hole is covered with the joint surface of the first member, so that a recess is formed in which the joint surface of the first member serves as the bottom of the recess and the inner circumferential surface of the through hole of the insertion jig serves as the side surface of the recess. In this case, even when the first member does not have a portion rising from its joint surface (the first member does not have a recess having the joint surface serving as a bottom), the brazing material, the powder, and the second member can be inserted into the recess formed by the first member and the insertion jig. Therefore, the first member and the second member can be joined to each other by forming the joint layer including the brazing material and the powder inside the recess. As described above, the joined body including the first member and the second member joined thereto can be produced irrespective of whether or not the first member has a portion rising from its joint surface. The joint layer is formed using the brazing material having a larger thermal expansion coefficient than the first member and the powder of a material having a smaller thermal expansion coefficient than the brazing material. Therefore, the occurrence of cracking in the first member due to a change in the temperature of the joined body can be suppressed more effectively than when, for example, the joint layer is formed using only the brazing material. The insertion jig may be removed after the step (c). Preferably, in the step (b), the second member is disposed such that the joint surface of the second member faces the joint surface of the first member. Preferably, in the step (b), the brazing material and the powder are disposed such that the powder can be impregnated with the brazing material in the step (c). For example, the brazing material and the powder may be disposed such that the brazing material and the powder are in contact with each other.

In the step (b) in the joined body manufacturing method of the present invention, a clearance may be 1 mm or less, the clearance being the difference between the inner diameter of the through hole and the outer diameter of a side surface of the second member that is a surface thereof facing the inner circumferential surface of the through hole. When the clearance is large, the powder disposed inside the through hole extends outward excessively from the side surface of the second member. However, this can be effectively prevented when the clearance is 1 mm or less.

In the joined body manufacturing method of the present invention, the insertion jig may include carbon. Since carbon has relatively low wettability to the brazing material (metal), the insertion jig including carbon can be easily removed after the formation of the joint layer.

In the joined body manufacturing method of the present invention, the powder may be made of the same ceramic material as the first member. In this case, the thermal expansion coefficient of the first member is substantially the same as the thermal expansion coefficient of the powder, so that the occurrence of cracking in the first member due to a change in the temperature of the joined body can be suppressed more effectively.

In the step (b) of the joined body manufacturing method of the present invention, the joint surface of the first member may be coated in advance with a material having higher wettability to the brazing material than the joint surface of the first member, and/or the joint surface of the second member may be coated in advance with a material having higher wettability to the brazing material than the joint surface of the second member, and/or the powder may be coated in advance with a material having higher wettability to the brazing material than the powder. When a material having high wettability to the brazing material is used as a coating, the coated material is easily wettable to the brazing material, so that the joint strength of the joined body can be improved. In this case, it is preferable that at least two of the joint surface of the first member, the joint surface of the second member, and the powder are coated, and it is more preferable that all of them are coated.

In the joined body manufacturing method of the present invention, the first member may not have a portion rising from the joint surface thereof. In other words, the first member may not have a recess having a bottom serving as the joint surface. With the joined body manufacturing method of the present invention, even the first member that does not have a portion rising from its joint surface can be joined to the second member. Therefore, the significance of the application of the present invention is high.

In the joined body manufacturing method of the present invention, the second member may have a vent hole that opens on the joint surface of the second member and on a surface other than the joint surface of the second member. In this case, gas (e.g., air) present between the particles of the powder in the step (c) can flow to the outside through the vent hole, so that the space between the particles of the powder can be easily impregnated with the brazing material. The vent hole may open on the joint surface of the second member and on its side surface facing the inner circumferential surface of the through hole. In this case, when part of the brazing material does not penetrate into the powder but climbs up the side wall of the second member in the step (c), the part of the brazing material can be returned to the joint surface side of the second member through the vent hole. Therefore, the powder can be sufficiently impregnated with the brazing material.

DETAILED DESCRIPTION OF THE INVENTION

Figure 1:
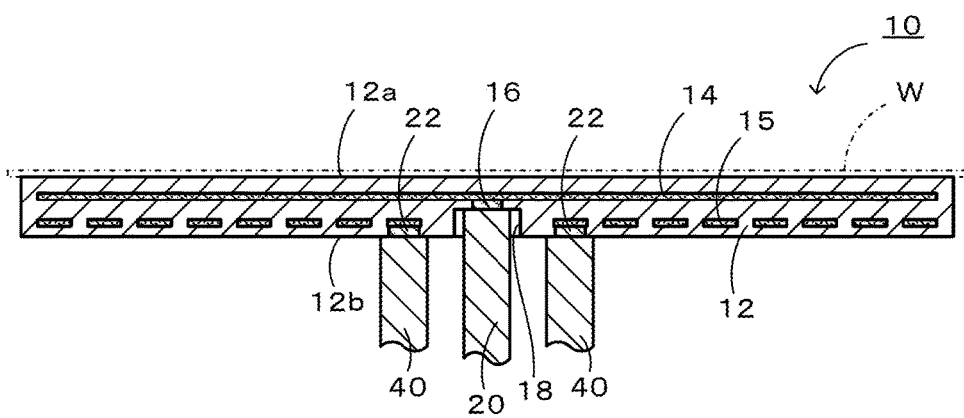
FIG. 1 is a cross-sectional view of an electrostatic chuck 10, the electrostatic chuck 10 being cut along its center axis.
Figure 2:
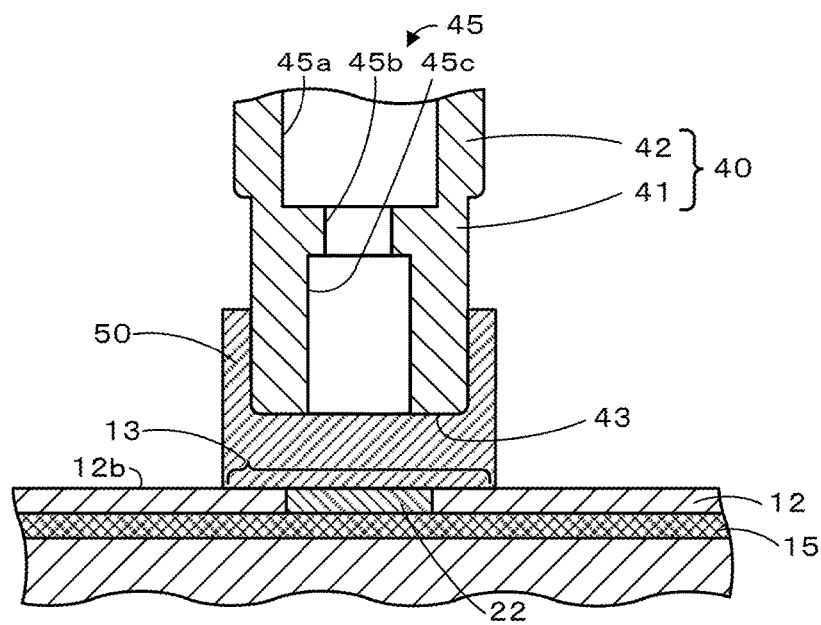
FIG. 2 is an enlarged cross-sectional view of a joint portion between a ceramic substrate 12 and a feeding terminal 40.

Embodiments of the present invention will next be described with reference to the drawings. FIG. 1 is a cross-sectional view of an electrostatic chuck 10, which is one embodiment of the joined body of the present invention, the electrostatic chuck 10 being cut along its center axis. FIG. 2 is an enlarged cross-sectional view of a joint portion between a ceramic substrate 12 and a feeding terminal 40 in FIG. 1. In FIG. 2, the vertical direction in FIG. 1 is reversed.

In the electrostatic chuck 10 in the present embodiment, a wafer-placing surface 12a on which a wafer W can be placed is formed on the ceramic substrate 12, and an electrostatic electrode 14 and a heater electrode 15 are embedded in the ceramic substrate 12 so as to be parallel to the wafer-placing surface 12a.

The ceramic substrate 12 is a disk-shaped member composed mainly of a ceramic material such as alumina or aluminum nitride. No particular limitation is imposed on the thickness of the ceramic substrate 12, and the thickness is, for example, 1 mm to 30 mm. The present invention is particularly effective for a thin structure in which a counterbore cannot be provided.

The electrostatic electrode 14 is a disk-shaped thin-layer electrode having a smaller diameter than the ceramic substrate 12. The electrostatic electrode 14 may be a flat plate or may be a mesh prepared by weaving thin metal wires into a net-like sheet. A conductive tablet 16 is connected to the center of the electrostatic electrode 14. The tablet 16 is exposed at the bottom of a counterbore 18 that is formed so as to extend from a rear surface 12b of the ceramic substrate 12 to the tablet 16. A portion of the ceramic substrate 12 that is located between the electrostatic electrode 14 and the wafer-placing surface 12a functions as a dielectric layer of the electrostatic chuck 60. A feeding terminal 20 is inserted into the counterbore 18. The feeding terminal 20 is joined to the bottom of the counterbore 18 (the upper surface in FIG. 1) and is electrically continuous with the tablet 16. The feeding terminal 20 is a metallic member, and examples of its material include Mo, Ti, and Kovar.

The heater electrode 15 is formed so as to extend from its one end to the other end that are located near the center of the ceramic substrate 12 over the entire ceramic substrate 12 in a unicursal manner. Conductive tablets 22 are connected to one end and the other end of the heater electrode 15. No particular limitation is imposed on the diameter of the tablets 22, and the diameter is, for example, 3 mm or less. Examples of the material of the tablets 22 include Mo, NbC, WC, Pt, and Nb. The tablets 22 are different from the tablet 16 in that they are not exposed at the bottom surfaces of counterbores (recesses) but are exposed directly at the rear surface 12b of the ceramic substrate 12. Feeding terminals 40 are joined to the rear surface 12b of the ceramic substrate 12, and the feeding terminals 40 are thereby electrically continuous with the tablets 22.

The feeding terminals 40 will be described in detail. Each of the feeding terminals 40 is a substantially cylindrical member having a vent hole 45 formed at its center and includes a small-diameter portion 41 and a large-diameter portion 42 having a larger diameter than the small-diameter portion 41. No particular limitation is imposed on the outer diameter of the large-diameter portion 42, and the outer diameter is, for example, 3 mm to 12 mm. The vent hole 45 is a through hole that opens at the both ends of the feeding terminal 40 (the upper and lower ends in FIG. 2) and is formed as a hole including a first hole 45a passing through the large-diameter portion 42 and second and third holes 45b and 45c passing through the small-diameter portion 41 and in communication with the first hole 45a. Although not illustrated, a spiral groove is formed on the inner circumferential surface of the first hole 45a, and an end of a rod-shaped electrode for supplying electric power to the heater electrode 15 through the feeding terminal 40 is to be screwed into the first hole 45a. In the feeding terminal 40, its end surface on the small-diameter portion 41 side (the lower surface in FIG. 2) serves as a joint surface 43. In the present embodiment, since the vent hole 45 passes through the feeding terminal 40, the joint surface 43 has a ring shape. The joint surface 43 is joined to a joint surface 13 of the ceramic substrate 12 through a joint layer 50. The feeding terminal 40 is a metallic member, and examples of the material of the feeding terminal 40 include Mo, Ti, and Kovar. The joint layer 50 is a substantially cylindrical member. The joint layer 50 will be described later. The joint surface 13 is part of the rear surface 12b of the ceramic substrate 12 and is a substantially circular region in contact with the lower surface of the joint layer 50. The tablets 22 are exposed at the joint surfaces 13 in the rear surface 12b. The tablets 22 are joined to the feeding terminals 40 through the joint layers 50, and the tablets 22 are thereby electrically continuous with the feeding terminals 40.

A method for manufacturing the electrostatic chuck 10 in the present embodiment will next be described below with reference to FIG. 3A to 3G. First, a thin film 114 is formed on a ceramic sintered body 111a, and the tablet 16 is bonded to the center of the thin film 114. Then a ceramic compact (a compact formed from a ceramic powder) 111b is formed on the thin film 114 to obtain a first intermediate 127 (see FIG. 3A). The thin film 114 is an electrode paste containing the raw material of the electrostatic electrode 14.

Separately from the first intermediate 127, a ceramic sintered body 111c is formed, and closed-bottom holes are formed in the ceramic sintered body 111c at portions corresponding one end and the other end of the heater electrode 15. The tablets 22 coated with an adhesive are fitted into the closed-bottom holes, and then a pattern 115 is produced by screen printing or a doctor blade to prepare a second intermediate 128 (see FIG. 3B). The pattern 115 later becomes the heater electrode 15 and is produced, for example, using the same material as the electrostatic electrode 14.

Figure 3A:
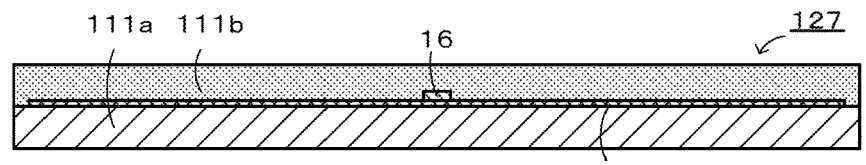
FIG. 3A to FIG. 3G are an illustrations of a step of manufacturing the electrostatic chuck 10.
Figure 3B:
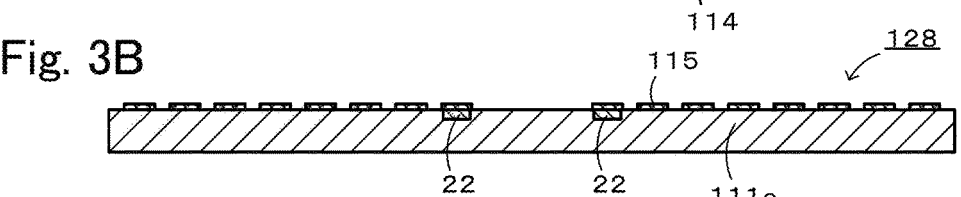
Figure 3C:
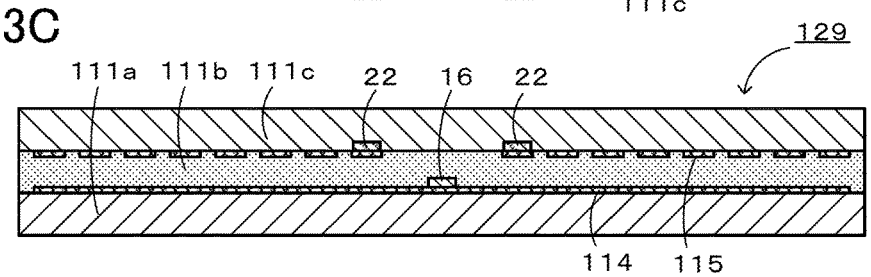
Figure 3D:
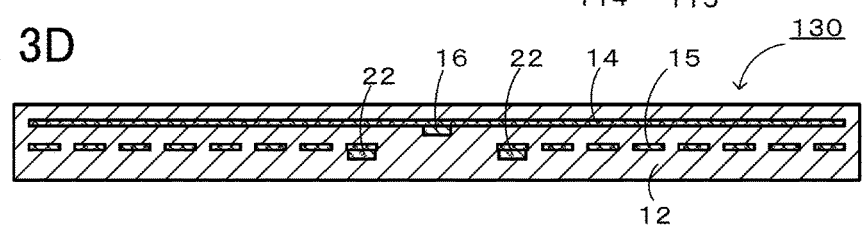

Next, the second intermediate 128 is placed on the ceramic compact 111b of the first intermediate 127 such that the pattern 115 is in contact with the ceramic compact 111b, and the intermediates are integrated by uniaxial press molding to thereby obtain a laminate 129 (see FIG. 3C). Then the laminate 129 is subjected to hot-press firing to obtain an electrode-embedded sintered body 130 (see FIG. 3D). In this manner, the ceramic sintered body 111a, the ceramic compact 111b, and the ceramic sintered body 111c form one sintered body (the ceramic substrate 12). The thin film 114 serves as the electrostatic electrode 14, and the pattern 115 serves as the heater electrode 15.

Figure 3E:
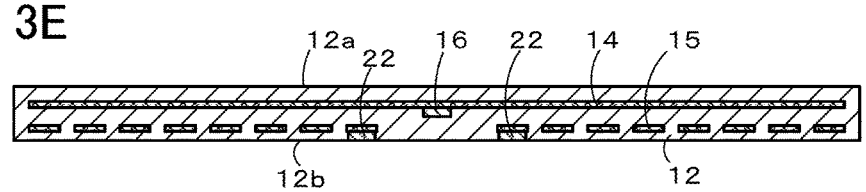

Next, the rear surface side of the electrode-embedded sintered body 130 (the lower side in FIG. 3D) is ground so that the surfaces of the tablets 22 are exposed at the rear surface 12b (see FIG. 3E). Preferably, the front surface side of the electrode-embedded sintered body 130 (the upper side in FIG. 3D) is also ground such that the wafer-placing surface 12a has a surface roughness Ra of 0.01 to 3 μm and a flatness of 0 to 10 μm and that the distance from the upper surface of the electrostatic electrode 14 to the wafer-placing surface 12a is 0.2 to 1 mm.

Figure 3F:
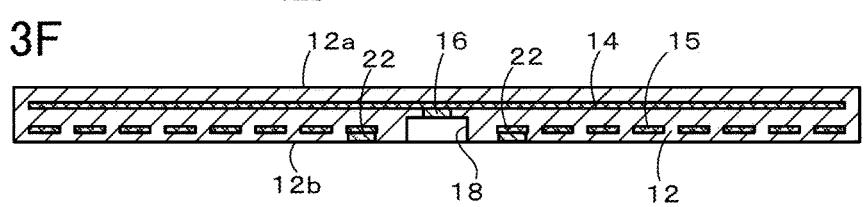
Figure 3G:
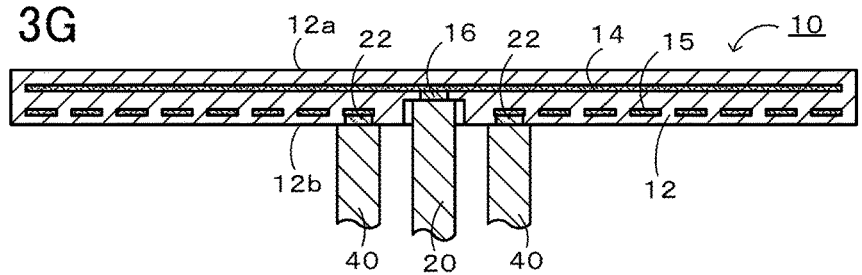
Figure 4:
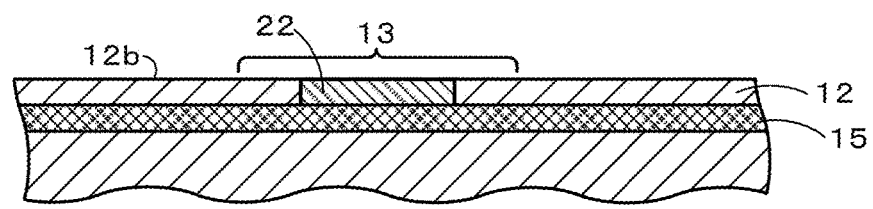
FIG. 4 is an illustration of a step of joining each feeding terminal 40 to a ceramic substrate 12.

Then the counterbore 18 is formed at the center of the rear surface 12b of the electrode-embedded sintered body 130 to expose the tablet 16 (see FIG. 3F). Then the feeding terminal 20 is inserted into the counterbore 18 and joined to the bottom of the counterbore 18 to establish electrical continuity between the tablet 16 and the feeding terminal 20. The feeding terminals 40 are joined to the rear surface 12b of the ceramic substrate 12, so that the tablets 22 are electrically continuous with the feeding terminals 40. The electrostatic chuck 10 is thereby completed (see FIG. 3G).

The method for manufacturing the electrostatic chuck 10 that is a joined body obtained by joining the feeding terminals 40 to the ceramic substrate 12 will be described in detail. FIGS. 4 to 13 are illustrations of the step of joining each feeding terminal 40 to the ceramic substrate 12.

Figure 5:
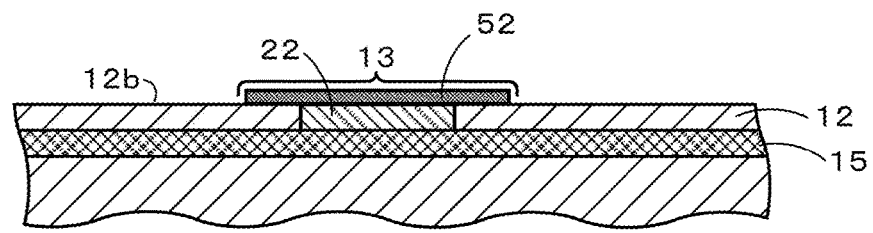
FIG. 5 is an illustration of a step of joining each feeding terminal 40 to a ceramic substrate 12.

First, in the step (a), a prescribed area, which is part of the rear surface 12b of the ceramic substrate 12, is defined as a joint surface 13 (see FIG. 4), and the joint surface 13 is coated with a substrate-coating layer 52 (see FIG. 5). The joint surface 13 is defined such that a tablet 22 is exposed at the center of the joint surface 13. The wettability of the substrate-coating layer 52 to a brazing material 56 described later is higher than the wettability of the ceramic substrate 12 to the brazing material 56. Examples of the material of such a substrate-coating layer 52 include Ni and Au. No particular limitation is imposed on the thickness of the substrate-coating layer 52, and the thickness is, for example, 1 to 6 μm. The substrate-coating layer 52 is formed by, for example, electroless plating or sputtering with the rear surface 12b except for the joint surface 13 masked.

Figure 6:
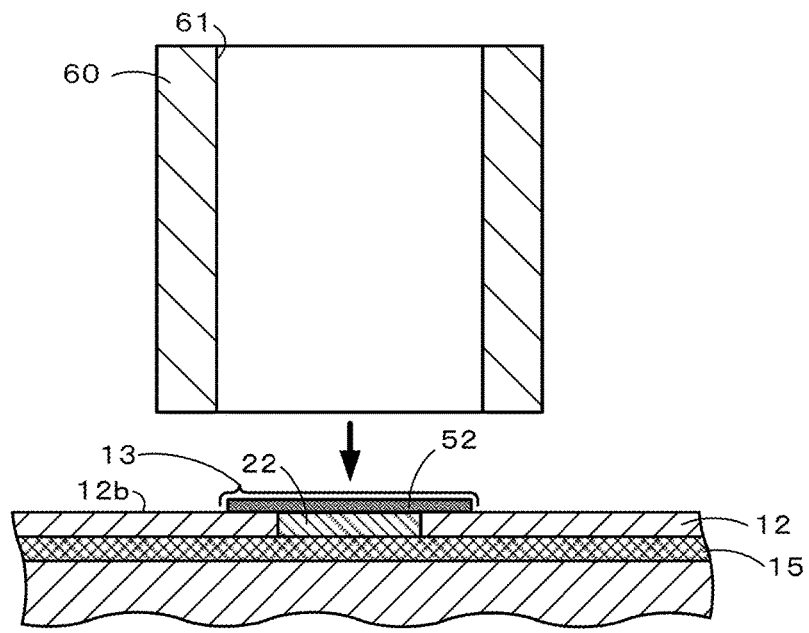
FIG. 6 is an illustration of a step of joining each feeding terminal 40 to a ceramic substrate 12.
Figure 7:
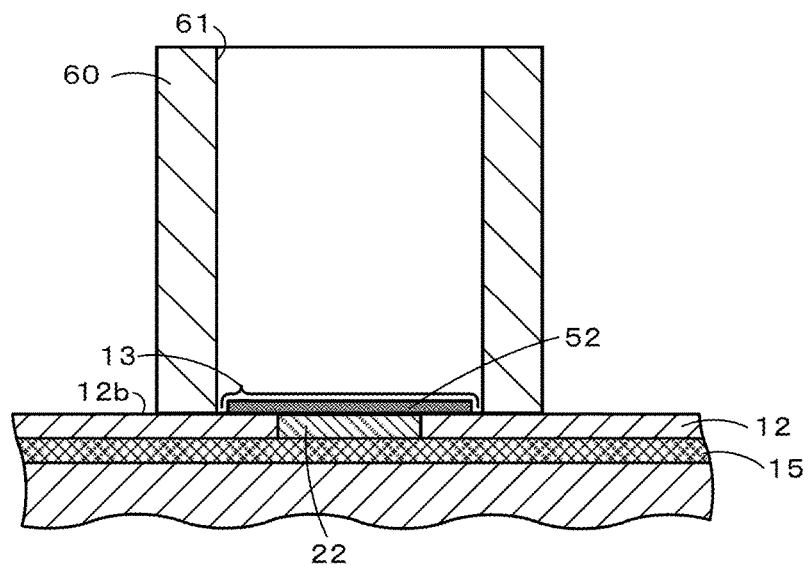
FIG. 7 is an illustration of a step of joining each feeding terminal 40 to a ceramic substrate 12.

Next, a guard ring 60 having a through hole 61 into which a feeding terminal 40 is insertable is disposed on the ceramic substrate 12 such that one of the openings of the through hole 61 is covered with the joint surface 13 of the ceramic substrate 12 (see FIGS. 6 and 7). The guard ring 60 is a cylindrical member, and the through hole 61 is a hole passing through the guard ring 60 in the vertical direction in FIG. 6. The guard ring 60 is removed after the feeding terminal 40 is joined to the ceramic substrate 12 and is made of preferably a material having low wettability to a brazing material 56 described later. In the present embodiment, the guard ring 60 is made of carbon. The axial length of the guard ring 60 (the vertical length in FIG. 6) is, for example, 3 mm to 30 mm. Preferably, the substrate-coating layer 52 is formed to have a size that can be accommodated in the guard ring 60, as shown in FIG. 7.

Figure 8:
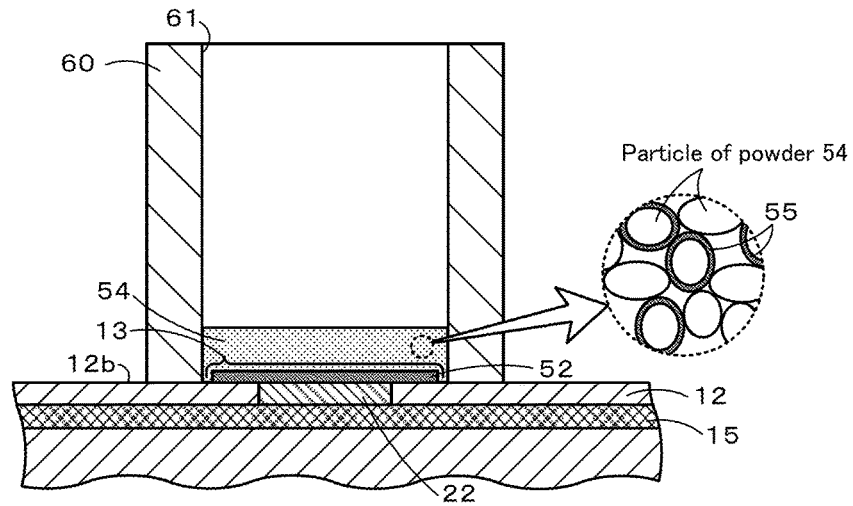
FIG. 8 is an illustration of a step of joining each feeding terminal 40 to a ceramic substrate 12.

After the step (a) is performed as described above, the step (b) is performed. In the step (b), first, a powder 54 is placed in the through hole 61 of the guard ring 60 and spread over the joint surface 13 (the substrate-coating layer 52) (FIG. 8). The powder 54 is made of a material having a smaller thermal expansion coefficient than the brazing material 56 described later. The powder 54 is made of a ceramic such as alumina or aluminum nitride. The average particle diameter of the powder 54 is, for example, 10 μm to 500 μm and preferably 20 μm to 100 μm. Preferably, the powder 54 is made of the same ceramic material as the ceramic substrate 12. In the powder 54, at least part of the particles are coated with a particle-coating layer 55 (see an enlarged view in FIG. 8). The wettability of the particle-coating layer 55 to the brazing material 56 is higher than the wettability of the particles of the powder 54 to the brazing material 56. Examples of the material of such a particle-coating layer 55 includes Ni and Au. No particular limitation is imposed on the thickness of the particle-coating layer 55, and the thickness is, for example, 1 to 3 μm. The particle-coating layer 55 may be formed by, for example, electroless plating. The coverage of the particles of the powder 54 disposed in the through hole 61 is preferably 40 to 60%. The coverage of the powder 54 means the ratio of the number of particles covered with the particle-coating layer 55 to the total number of particles of the powder 54. For example, when the coverage of the powder 54 is 40%, the particle-coating layer is formed on 40% of the particles of the powder 54 and is not formed on the remaining 60%, and these are mixed. When the coverage is equal to or more than the lower limit in the above-described range, the powder 54 is easily wettable to the brazing material 56, and the conductivity of the joint layer 50 after joining can be high. When the coverage is equal to or less than the upper limit, the occurrence of cracking in the ceramic substrate 12 caused by the difference in thermal expansion coefficient between the joint layer 50 and the ceramic substrate 12 when the temperature of the electrostatic chuck 10 is changed after joining can be suppressed more effectively.

Figure 9:
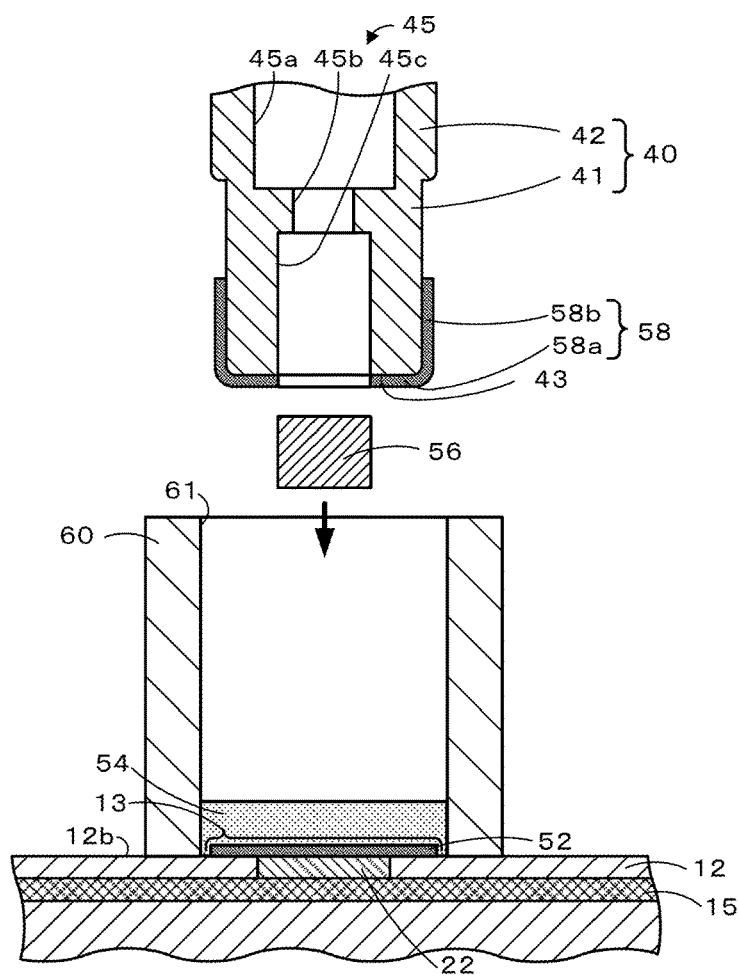
FIG. 9 is an illustration of a step of joining each feeding terminal 40 to a ceramic substrate 12.

Next, the brazing material 56 and the feeding terminals 40 are prepared (see FIG. 9). The brazing material 56 is formed of a metal having a larger thermal expansion coefficient than the ceramic substrate 12 and composed mainly of, for example, aluminum or Au. In the present embodiment, the brazing material 56 has a substantially cylindrical shape. Each feeding terminal 40 has the above-described shape. The brazing material 56 is formed to have a size that can be inserted into the third hole 45c through the opening of the feeding terminal 40 on the joint surface 43 side. In the feeding terminal 40, its end portion on the joint surface 43 side (the lower end portion in FIG. 9) is coated in advance with a terminal-coating layer 58. The terminal-coating layer 58 includes a bottom coating layer 58a and a side coating layer 58b. The bottom coating layer 58a covers the joint surface 43, which is the bottom surface of the small-diameter portion 41 of the feeding terminal 40. The side coating layer 58b covers the side surface of the feeding terminal 40 (the surface of the feeding terminal 40 that faces the inner circumferential surface of the through hole 61 after insertion into the guard ring 60). The bottom coating layer 58a and the side coating layer 58b are continuous to each other at the corner between the joint surface 43 and side surface of the feeding terminal 40 and are formed integrally.

The wettability of the terminal-coating layer 58 to the brazing material 56 is higher than the wettability of the feeding terminal 40 to the brazing material 56. Examples of the material of such a terminal-coating layer 58 include Ni and Au. No particular limitation is imposed on the thickness of the terminal-coating layer 58, and the thickness is, for example, 1 to 6 μm. The terminal-coating layer 58 is formed by, for example, electroless plating or sputtering after a portion of the side surface of the feeding terminal 40 that is not to be coated with the side coating layer 58b, the inner circumferential surface of the third hole 45c, etc. are masked.

Figure 10:
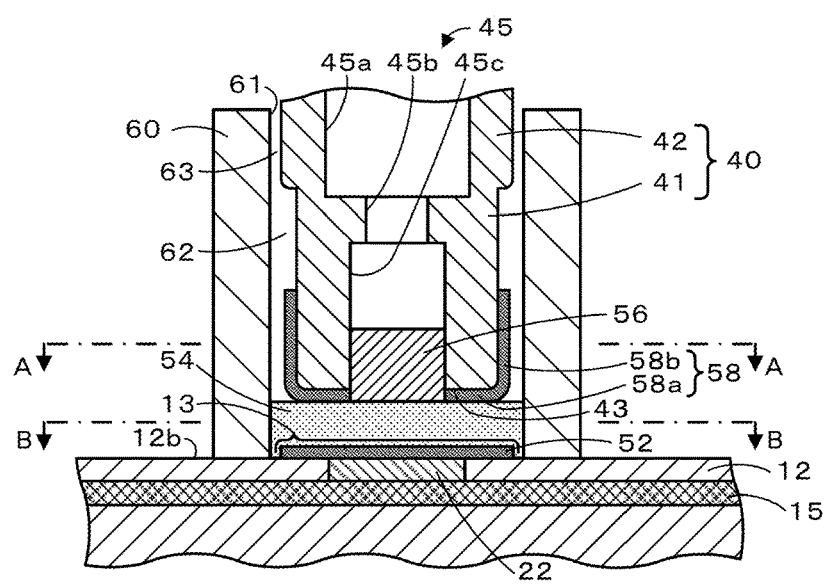
FIG. 10 is an illustration of a step of joining each feeding terminal 40 to a ceramic substrate 12.
Figure 11:
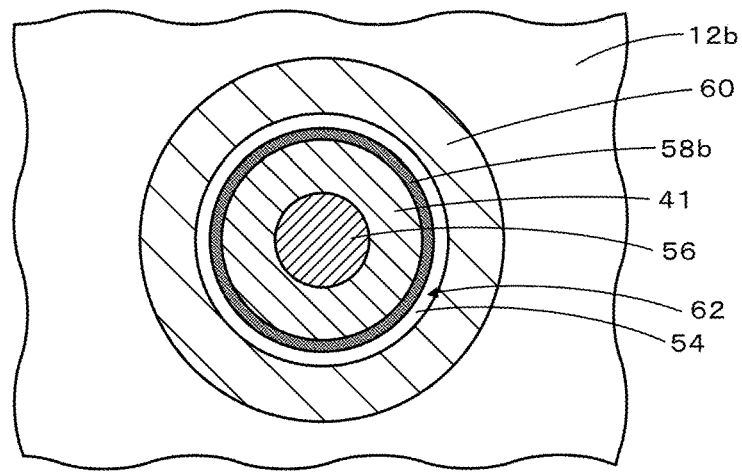
FIG. 11 is a cross section along A-A in FIG. 10.
Figure 12:
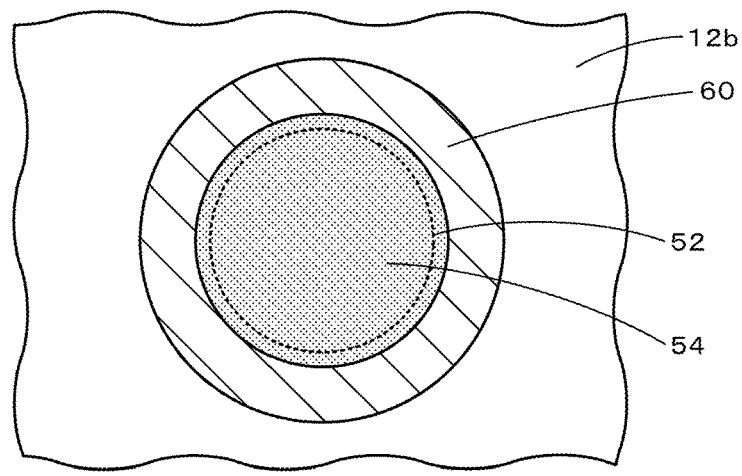
FIG. 12 is a cross section along B-B in FIG. 10.

Next, the brazing material 56 and the feeding terminal 40 are inserted in this order into the through hole 61 of the guard ring 60 (see FIG. 9). In this case, the brazing material 56 is disposed so as to be inserted into the third hole 45c of the feeding terminal 40. After completion of the insertion into the through hole 61, the joint surface 13 of the ceramic substrate 12 faces the joint surface 43 of the feeding terminal 40 (see FIG. 10). FIG. 11 is a cross section along A-A in FIG. 10, and FIG. 12 is a cross section along B-B in FIG. 10. In the state in FIG. 10, the powder 54 is in contact with the brazing material 56. In addition, the powder 54 is in contact with the brazing material 56 and with the terminal-coating layer 58 (the bottom coating layer 58a). A gap is formed between the side surface of the inserted feeding terminal 40 and the inner circumferential surface of the through hole 61. More specifically, a gap 62 is formed between the side surface of the small-diameter portion 41 and the inner circumferential surface of the through hole 61, and a gap 63 smaller than the gap 62 is formed between the side surface of the large-diameter portion 42 and the inner circumferential surface of the through hole 61. A clearance, which is the difference between the inner diameter of the through hole 61 and the outer diameter of the side surface of the feeding terminal 40 that faces the inner circumferential surface of the through hole 61, is preferably 1 mm or less. Specifically, in the present embodiment, the side surfaces (outer circumferential surfaces) of the small-diameter portion 41 and the large-diameter portion 42 of the feeding terminal 40 face the inner circumferential surface of the through hole 61 in the state in FIG. 10. Therefore, it is preferable that both the difference between the inner diameter of the through hole 61 and the outer diameter of the small-diameter portion 41 and the difference between the inner diameter of the through hole 61 and the outer diameter of the large-diameter portion 42 are 1 mm or less. The clearance may be, for example, 0.01 mm or more and may be 0.1 mm or more. No particular limitation is imposed on the lower limit of the clearance, so long as the gap allows the feeding terminal 40 to be inserted into the through hole 61. Part of the side surface of the feeding terminal 40 may be in contact with the inner circumferential surface of the through hole 61. The clearance is fixed in consideration of the difference in thermal expansion coefficient between the guard ring 60 and the feeding terminal 40 such that thermal expansion in the step (c) described later does not cause damage to at least one of the guard ring 60 and the feeding terminal 40.

Figure 13:
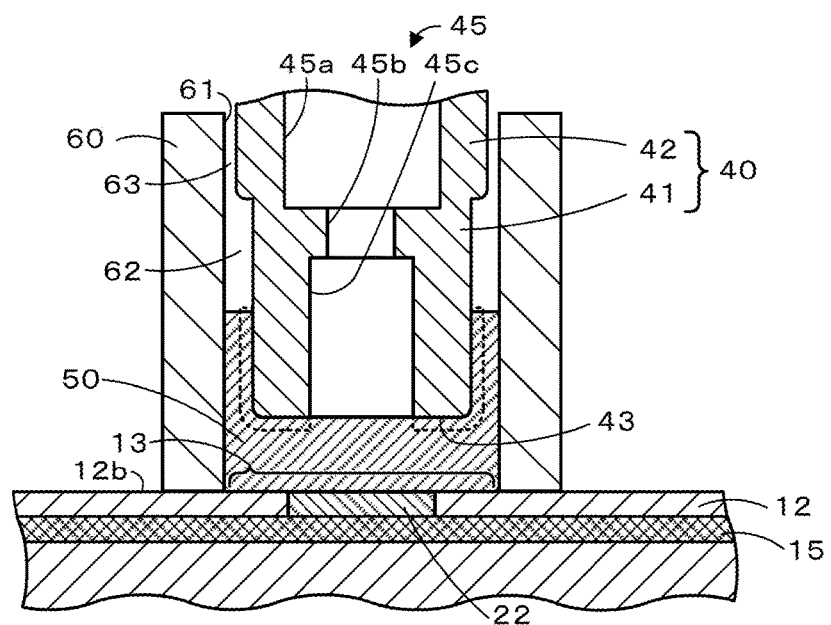
FIG. 13 is an illustration of the step of joining the feeding terminal 40 to the ceramic substrate 12.

After the step (b) is performed as described above, the step (c) is performed. In the step (c), the brazing material 56 is fused to impregnate the powder 54 with the brazing material 56. In this manner, a joint layer 50 containing the brazing material 56 and the powder 54 is formed, and the joint surface 13 of the ceramic substrate 12 and the joint surface 43 of the feeding terminal 40 are joined to each other through the joint layer 50 (see FIG. 13). The electrical continuity between the feeding terminal 40 (the joint surface 43) and the tablet 22 is established through the component of the brazing material 56 in the joint layer 50. As shown in FIG. 13, the substrate-coating layer 52, the particle-coating layer 55, and the terminal-coating layer 58 may also be fused, penetrate into the powder 54, and form part of the joint layer 50. The brazing material 56 is fused, for example, at a temperature higher by 10° C. to 150° C. than the melting point of the brazing material 56 and preferably at a temperature higher by 100° C. to 150° C. than the melting point. The holding time at this temperature is, for example, 5 minutes to 90 minutes and preferably 10 minutes to 30 minutes. The atmosphere during joining is, for example, an atmosphere with a high degree of vacuum of preferably $1 \times 10^{-4}$ Torr or lower and more preferably $2 \times 10^{-5}$ Torr or lower. The joining may be performed while the feeding terminal 40 and the guard ring 60 are pressed against the ceramic substrate 12.

When the feeding terminal 40 includes the side coating layer 58b, the surface of the side coating layer 58b is wetted with the brazing material 56. Therefore, in the state after joining, part of the brazing material 56 may climb up the gap between the through hole 61 and the side surface of the feeding terminal 40 up to near the upper end of a region in which the side coating layer 58b used to be present (see broken lines in FIG. 13). Specifically, part of the brazing material 56 may not penetrate into the powder 54 and may wet the side surface of the feeding terminal 40. By allowing the brazing material 56 to wet the side surface of the feeding terminal 40 as described above, the amount (ratio) of the brazing material 56 penetrating into the powder 54 can be controlled. The amount of the brazing material 56 climbing up the side surface of the feeding terminal 40 (the amount of the brazing material 56 not penetrating into the powder 54) can be adjusted by controlling the area of the side coating layer 58b covering the feeding terminal 40, the size of the gap 62, the difference between the inner diameter of the through hole 61 and the outer diameter of the small-diameter portion 41, etc.

After the step (c) is performed as described above to form the joint layer 50, the guard ring 60 is removed, and the joined body (the electrostatic chuck 10) shown in FIG. 2 in which each feeding terminal 40 is joined to the ceramic substrate 12 is thereby manufactured. There are two feeding terminals 40, and each of the two feeding terminals 40 is joined by performing the above-described steps (a) to (c). The feeding terminal 20 may be joined to the bottom of the counterbore 18 in the same manner as in the above-described steps (a) to (c) using the counterbore 18 instead of the guard ring 60 (see FIG. 1). Alternatively, a guard ring 60 is inserted into the counterbore 18, and then the feeding terminal 20 is joined to the bottom of the counterbore 18 in the same manner as in the above-described steps (a) to (c).

An example of the use of the electrostatic chuck 10 in the present embodiment will next be briefly described. A wafer W is placed on the wafer-placing surface 12a of the electrostatic chuck 10, and high DC voltage is applied to the electrostatic electrode 14 through the feeding terminal 20 of the electrostatic electrode 14 to generate electrostatic force, whereby the wafer W is attracted to the wafer-placing surface 12a. A heater power source is connected to the two feeding terminals 40, 40 of the heater electrode 15, and the supplied electric power is controlled to adjust the temperature of the wafer W to a desired temperature. In this state, the wafer W is subjected to plasma CVD to form a film or subjected to plasma etching. Specifically, in an unillustrated vacuum chamber, high-frequency voltage is applied to the electrostatic electrode 14 through the feeding terminal 20 to generate a plasma between parallel flat electrodes including the electrostatic electrode 14 embedded in the electrostatic chuck 10 and an unillustrated horizontal counter electrode disposed in an upper portion of the vacuum chamber, and the generated plasma is used to subject the wafer W to CVD to form a film or etching.

Next, the correspondences between the components in the present embodiment and the components in the present invention will be clarified. The ceramic substrate 12 in the present embodiment corresponds to the first member in the present invention, and each of the feeding terminals 40 corresponds to the second member in the present invention. The guard ring 60 corresponds to the insertion jig in the present invention, and the brazing material 56 corresponds to the brazing material in the present invention. The powder 54 corresponds to the powder in the present invention, and each of the joint layers 50 corresponds to the joint layer in the present invention.

In the above-described method for manufacturing the electrostatic chuck 10 in the present embodiment, when the metallic feeding terminals 40 are joined to the ceramic-made substrate 12, the guard rings 60 each having the through hole 61 are disposed on the ceramic substrate 12 in the step (a). In this case, each guard ring 60 is disposed on the ceramic substrate 12 such that one of the openings of the through hole 61 is covered with a corresponding joint surface 13 of the ceramic substrate 12, and a recess thereby formed in which the joint surface 13 of the ceramic substrate 12 serves as the bottom of the recess and the inner circumferential surface of the through hole 61 of the guard ring 60 serves as the side surface of the recess. In this case, even when the ceramic substrate 12 does not have portions rising from the joint surfaces 13 (the ceramic substrate 12 does not have recesses having bottoms serving as the joint surfaces 13), the brazing material 56, the powder 54, and the feeding terminals 40 can be inserted into recesses formed by the ceramic substrate 12 and the guard rings 60. Therefore, the joint layers 50 including the brazing material 56 and the powder 54 are formed inside the recesses, and each of the feeding terminals 40 can thereby be joined to the ceramic substrate 12. Since each joint layer 50 is formed using the brazing material 56 and the powder 54 made of a material having a smaller thermal expansion coefficient than the brazing material 56, the occurrence of cracking in the ceramic substrate 12 due to a change in the temperature of the electrostatic chuck 10 can be suppressed more effectively than when, for example, the joint layer 50 is formed using only the brazing material 56.

In the step (b), the clearance, which is the difference between the inner diameter of the through hole 61 and the outer diameter of the side surface of the feeding terminal 40 that faces the inner circumferential surface of the through hole 61, is 1 mm or less. Therefore, the powder 54 disposed inside the through hole 61 is more effectively prevented from extending outward excessively from the side surface of the feeding terminal 40.

The guard rings 60 are made of carbon and have relatively low wettability to the brazing material 56 (metal). Therefore, the guard rings 60 can be easily removed after the formation of the joint layers 50.

When the powder 54 is a powder made of the same ceramic material as the ceramic substrate 12, the thermal expansion coefficient of the ceramic substrate 12 is substantially the same as the thermal expansion coefficient of the powder 54, so that the occurrence of cracking in the ceramic substrate 12 due to a change in the temperature of the electrostatic chuck 10 can be suppressed more effectively.

Moreover, each joint surface 13 of the ceramic substrate 12 is coated with the substrate-coating layer 52 which is made of a material having higher wettability to the brazing material 56 than the joint surface 13, the joint surface 43 of each feeding terminal 40 is coated with the terminal-coating layer 58 which is made of a material having higher wettability to the brazing material 56 than the joint surface 43, and the powder 54 is coated with the particle-coating layer 55 which is made of a material having higher wettability to the brazing material 56 than the powder. Therefore, the coated joint surfaces 13 and the coated joint surfaces 43 are easily wettable to the brazing material 56, so that the joint strength of the electrostatic chuck 10 can be improved.

Since the ceramic substrate 12 does not have portions rising from the joint surfaces 13, the significance of the application of the present invention is high. For example, if the tablets 22 are exposed at the bottoms of counterbores (recesses) formed on the rear surface 12b, an additional thickness corresponding to the height of the counterbores is required for the ceramic substrate 12, so that the thickness of the ceramic substrate 12 cannot be easily reduced. For susceptors for semiconductors such as the electrostatic chuck 10, there is a need for relatively thin ceramic substrates 12 having a thickness of, for example, 1 mm. Even in this case, the application of the present invention allows the feeding terminals 40 to be joined to the ceramic substrate 12 even though the joint surfaces 13 are not the bottoms of counterbores. Therefore, the ceramic substrate 12 can be easily reduced in thickness.

Each feeding terminal 40 has the vent hole 45 that opens on the joint surface 43 and on a surface other than the joint surface 43 (the upper surface of the feeding terminal 40 that is opposite to the joint surface 43). Therefore, gas (e.g., air) present between the particles of the powder in the step (c) can flow to the outside through the vent hole 45, so that the space between the particles of the powder 54 can be easily impregnated with the brazing material 56.

The present invention is not limited the embodiment described above. It will be appreciated that the present invention can be implemented in various forms so long as they fall within the technical scope of the invention.

In the embodiment described above, the substrate-coating layer 52, the particle-coating layer 55, and the terminal-coating layer 58 are formed. However, for example, at least one of them may be omitted. When at least one of the joint surface 13, the joint surface 43, and the powder 54 has sufficiently high wettability to the brazing material 56, the joint force between the ceramic substrate 12 and the feeding terminal 40 through the joint layer 50 is sufficient even when the coating layer for the high wettability portion is omitted. Only the bottom coating layer 58a in the terminal-coating layer 58 may be formed, and the side coating layer 58b may be omitted. Even when the side coating layer 58b is omitted, the amount of the brazing material 56 penetrating into the powder 54 can be adjusted by controlling, for example, the amount of the brazing material 56.

Figure 14:
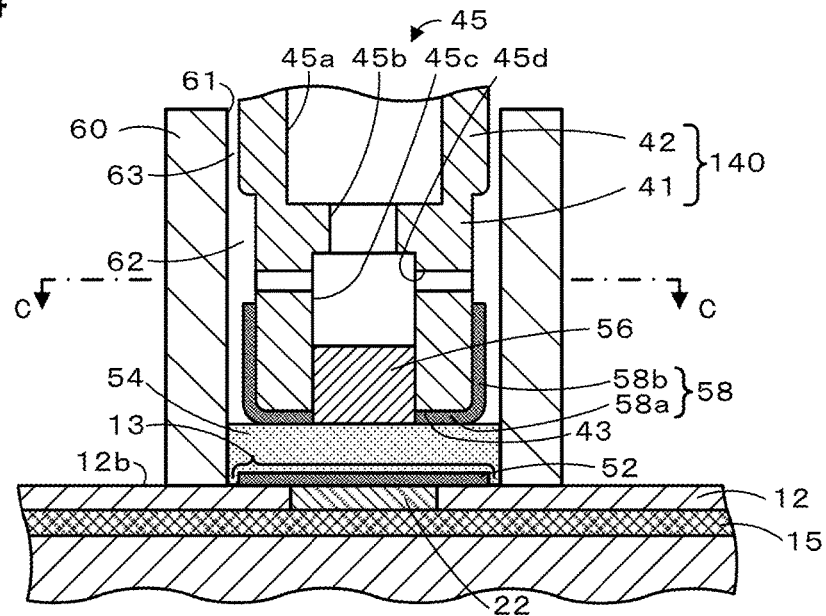
FIG. 14 is an enlarged cross-sectional view of a joint portion between the ceramic substrate 12 and a feeding terminal 140 in a modification.
Figure 15:
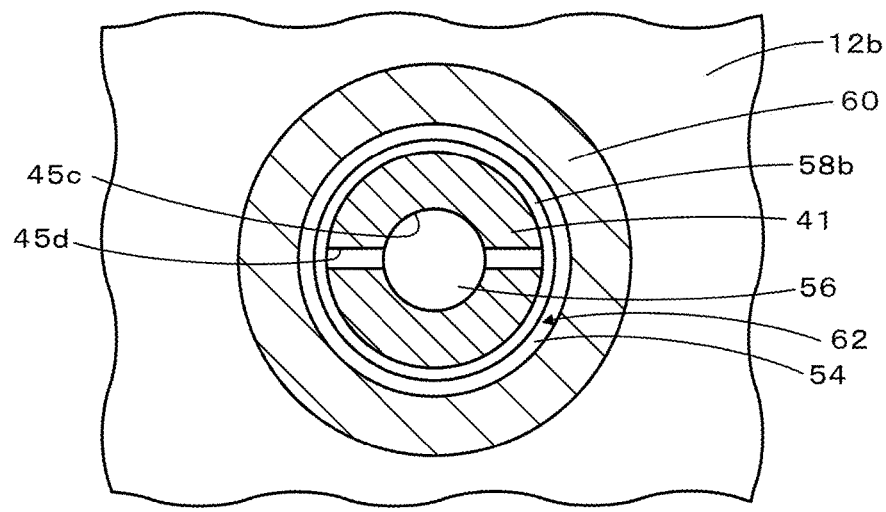
FIG. 15 is a cross section along C-C in FIG. 14.

In the embodiment described above, the vent hole 45 is a hole that opens on the joint surface 43 of the feeding terminal 40 and on the surface opposite to the joint surface 43, but this is not a limitation. For example, the vent hole 45 may open on the joint surface 43 and on the side surface of the feeding terminal 40. FIG. 14 is an enlarged cross-sectional view of a joint portion between the ceramic substrate 12 and a feeding terminal 140 in a modification. FIG. 15 is a cross section along C-C in FIG. 14. This feeding terminal 140 has a vent hole 45 including first to third holes 45a to 45c that are the same as those of the feeding terminal 40 described above and further including a fourth hole 45d. The fourth hole 45d passes through the small-diameter portion 41 so as to be parallel to the joint surface 43 and opens on the side surface of the small-diameter portion 41 and on the inner circumferential surface of the third hole 45c. Therefore, the vent hole 45 opens on the joint surface 43, on the surface opposite to the joint surface 43, and on the side surface of the feeding terminal 140. Since the vent hole 45 opens on the joint surface 43 and on the side surface of the feeding terminal 140, when part of the brazing material 56 climbs up the side wall of the feeding terminal 140 without penetration into the powder 54 in the step (c), this brazing material 56 can be returned to the joint surface 43 side of the feeding terminal 140 through the vent hole 45 (the fourth hole 45d and the third hole 45c). This can suppress excessive climbing of the brazing material 56 along the side surface of the feeding terminal 140, and the powder 54 can be sufficiently impregnated with the brazing material 56. For example, the second hole 45b may not be provided. In this case, the third hole 45c and the fourth hole 45d form the vent hole.

In the embodiment described above, each feeding terminal 40 has a vent hole 45 passing therethrough but may have no vent hole 45. For example, each feeding terminal 40 may not have the second hole 45b and may have only the first hole 45a and the third hole 45c. Also in the feeding terminal 140 in the modification shown in FIG. 14, the feeding terminal 140 may not have the second hole 45b and may have only the first hole 45a, the third hole 45c, and the fourth hole 45d.

Figure 16:
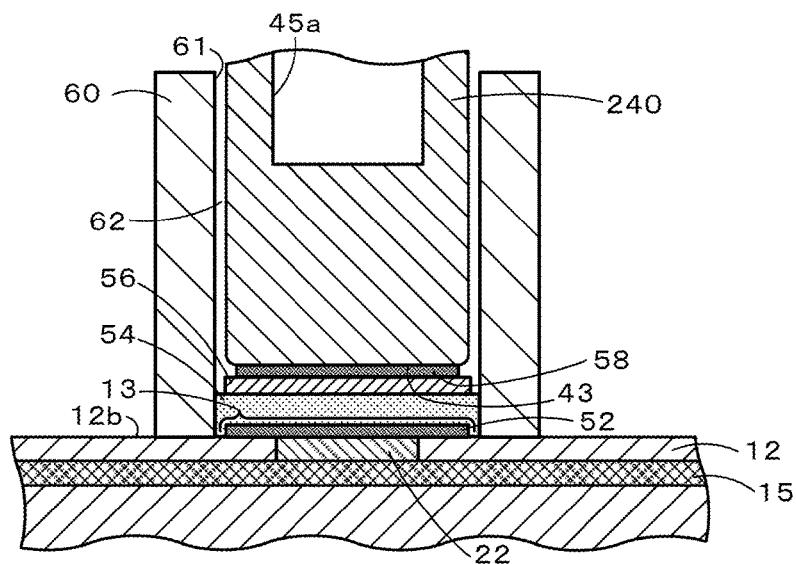
FIG. 16 is an enlarged cross-sectional view of a joint portion between the ceramic substrate 12 and a feeding terminal 240 in a modification.
Figure 17:
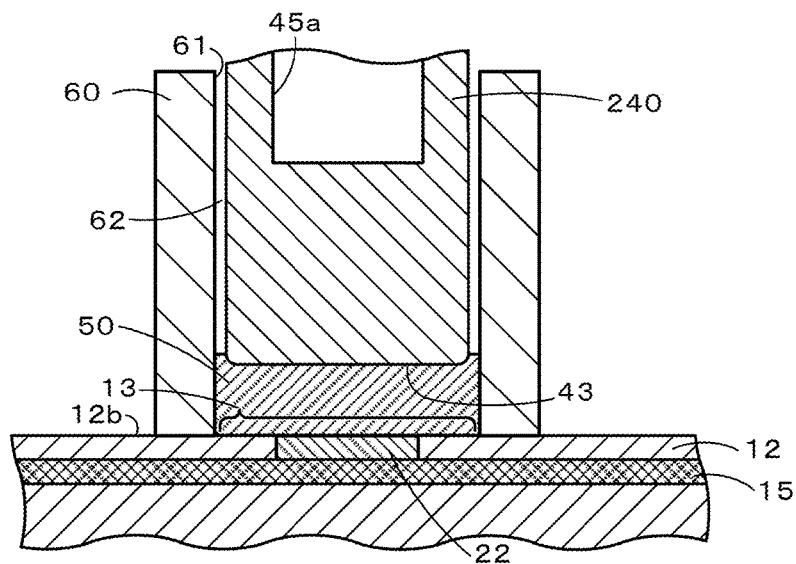
FIG. 17 is an enlarged cross-sectional view of the joint portion between the ceramic substrate 12 and the feeding terminal 240 in the modification.
Figure 18:
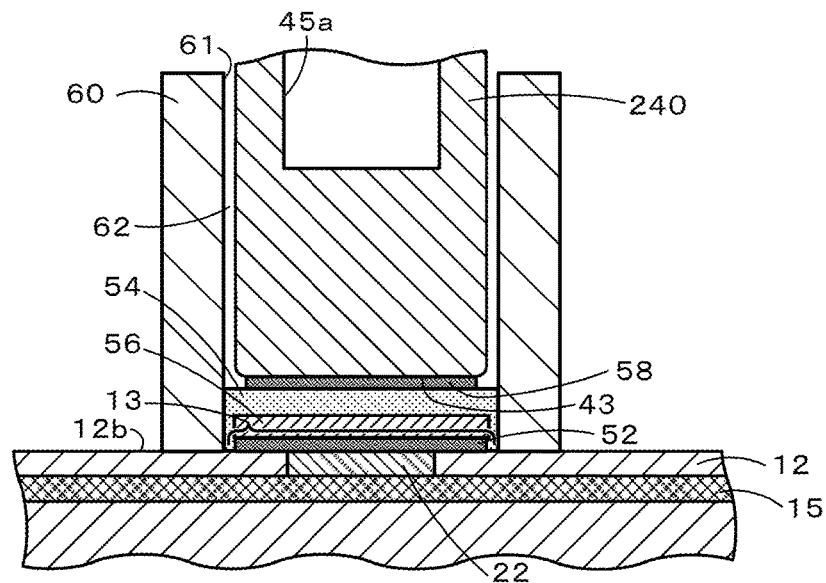
FIG. 18 is an enlarged cross-sectional view showing another example of the arrangement of a powder 54 and a brazing material 56.

In the embodiment described above, the brazing material 56 inserted into the third hole 45c of the feeding terminal 40 is disposed inside the through hole 61 in the step (b), but this is not a limitation. For example, the brazing material 56 and the powder 54 may be disposed between the joint surface 13 and the joint surface 43. FIG. 16 is an enlarged cross-sectional view of a joint portion between the ceramic substrate 12 and a feeding terminal 240 in a modification. In contrast to the feeding terminal 40, the feeding terminal 240 is a cylindrical member having a constant diameter over the entire portion from the upper end to the lower end, as shown in FIG. 16. Specifically, the feeding terminal 240 corresponds to a feeding terminal formed such that the small-diameter portion 41 and the large-diameter portion 42 in the feeding terminal 40 have the same diameter. In contrast to the feeding terminal 40, the feeding terminal 240 does not have the second hole 45b and the third hole 45c, and the first hole 45a is a closed-end hole. In the feeding terminal 240, a terminal-coating layer 58 (corresponding to the bottom coating layer 58a in the embodiment described above) is formed only on the joint surface 43, which is the lower surface of the feeding terminal 240. When this feeding terminal 240 is joined to a joint surface 13, a brazing material 56 having a plate shape (e.g., a disk shape) is placed on the powder 54 in the step (b) as shown in FIG. 16, and then the feeding terminal 240 is disposed on the brazing material 56. Then the brazing material 56 is fused in the step (c) to form a joint layer 50 including the powder 54 and the brazing material 56 in the same manner as in the embodiment described above, and the feeding terminal 240 can thereby be joined to the ceramic substrate 12 (see FIG. 17). In the embodiment described above, the powder 54 is spread over the through hole 61, and then the brazing material 56 is inserted into the through hole 61. However, the brazing material 56 may be inserted into the through hole 61 before the powder 54 is inserted, as shown in FIG. 18. FIG. 18 shows the powder 54 and the brazing material 56 inserted in reverse order to that in FIG. 16.

In the above-described embodiment, the feeding terminal 20 is joined to the bottom of the counterbore 18 in the ceramic substrate 12, but this not a limitation. For example, the counterbore 18 may not be formed, and the surface of the tablet 16 may be exposed at the rear surface 12b of the ceramic substrate 12. In this case, as in the feeding terminals 40 joined to the ceramic substrate 12 in the above-described embodiment, the feeding terminal 20 may be joined through a joint layer 50 to the rear surface 12b including the exposed surface of the tablet 16.

Figure 19:
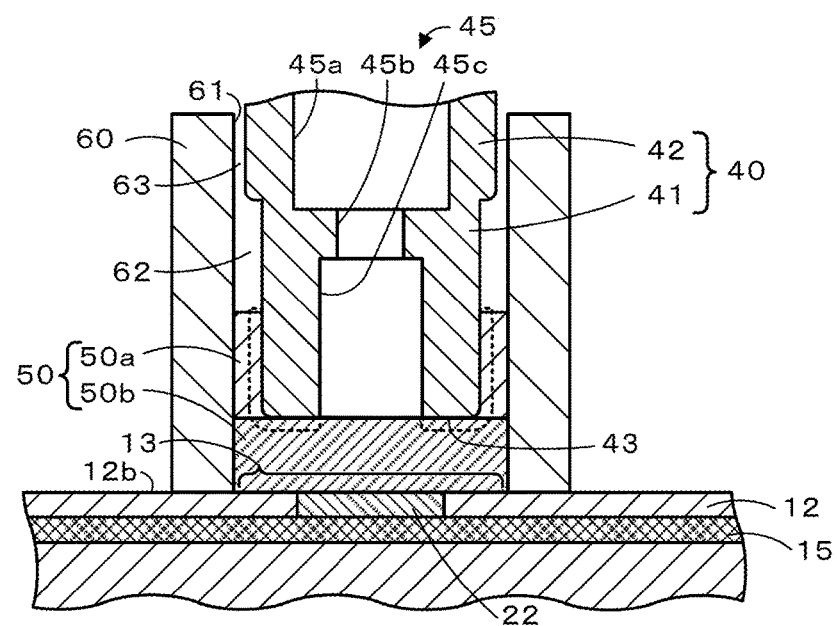
FIG. 19 is an illustration of joint layers 50a and 50b included in a joint layer 50.

As described in the above embodiment, the clearance, which is the difference between the inner diameter of the through hole 61 and the outer diameter of the side surface of the feeding terminal 40 that faces the inner circumferential surface of the through hole 61, is 1 mm or less in the step (b), so that the powder 54 disposed inside the through hole 61 is more effectively prevented from extending outward excessively from the side surface of the feeding terminal 40. Another effect obtained when the clearance is 1 mm or less is that the occurrence of cracking in the ceramic substrate 12 due to a chance in the temperature of the joined body can be more effectively suppressed. The reason for this will be described. FIG. 19 is an illustration showing the details of the joint layer 50 in FIG. 13 and showing joint layers 50a and 50b included in the joint layer 50. When part of the brazing material 56 climbs up the gap between the through hole 61 and the feeding terminal 40 in the step (c), the joint layer 50 includes a joint layer 50a and a joint layer 50b in different states as shown in FIG. 19, although not illustrated in FIG. 13 in the embodiment described above. The joint layer 50b is a region of the joint layer 50 that is located mainly between the joint surface 13 and the joint surface 43. The joint layer 50a is a region of the joint layer 50 that is mainly formed so as to climb up the gap between the through hole 61 and the side surface of the feeding terminal 40. The ratio of the powder 54 tends to be smaller in the joint layer 50a than in the joint layer 50b, and the ratio of the brazing material 56 tends to be larger in the joint layer 50b than in the joint layer 50a. Therefore, the thermal expansion coefficient tends to be larger in the joint layer 50a than in the joint layer 50b. If the radial thickness of the joint layer 50a is excessively large, cracking tends to occur in the ceramic substrate 12 due to the difference in thermal expansion between the joint layer 50a and the ceramic substrate 12 when the temperature of the joined body is changed. By fixing the clearance to be 1 mm or less, the radial thickness of the joint layer 50a becomes small, and the occurrence of cracking can be suppressed more effectively.

EXAMPLES

Example 1

In Example 1, a joined body including the ceramic substrate 12 and the feeding terminals 40 was produced in the same manner as in the manufacturing method described using FIGS. 4 to 13 above. Specifically, first, alumina powder with a purity of 99.5% was fired such that the density after firing was 99.5% or more. The fired product was ground to produce a disk-shaped alumina sintered body having an outer diameter of 300 mm and a thickness of 4 mm and used as the ceramic substrate 12. In Example 1, Mo-made tablets 22 were embedded in the alumina powder in advance, and the fired ceramic substrate 12 was ground until the surfaces of the tablets 22 were exposed. In the step (a), 5 mm-diameter regions of the ceramic substrate 12 (including 2.0 mm-diameter regions, i.e., the surfaces of the tablets 22) were used as the joint surfaces 13. A region other than the joint surfaces 13 was masked, and electroless Ni plating with a purity of 99% and a thickness of about 1 μm was formed to obtain substrate-coating layers 52 covering the joint surfaces 13 and having a diameter of 5 mm. Next, carbon-made guard rings 60 having an inner diameter of 6 mm and an axial length of 10 mm were prepared. Each guard ring 60 was disposed on the ceramic substrate 12 such that one of the openings of the through hole 61 was covered with a corresponding joint surface 13 of the ceramic substrate 12.

Next, in the step (b), the powder 54 was placed in the through holes 61 of the guard rings 60 and spread over the joint surfaces 13 (the substrate-coating layers 52). The powder 54 used was made of alumina and had an average particle diameter of 48 μm. The powder amount of the powder 54 was 20 mg. The particle-coating layer 55 made of electroless Ni plating having a thickness of 1 μm was formed in advance on one-half of the particles of the powder 54. Specifically, the coverage of the powder 54 was 50%. Next, the brazing material 56 and the feeding terminals 40 were prepared. With the brazing material 56 inserted into the third holes 45c of the feeding terminals 40, the feeding terminals 40 (and the brazing material 56) were inserted into the through holes 61 of the guard rings 60. The brazing material 56 was aluminum (A5005) and had a disk shape with a diameter of 2.4 mm and a thickness of 2 mm. Each of the feeding terminals 40 was made of Mo. The outer diameter of the small-diameter portion 41 was 5.15 mm, and the axial length of the small-diameter portion 41 was 5 mm. The outer diameter of the large-diameter portion 42 was 5.99 mm, and the axial length of the large-diameter portion 42 was 16 mm. The diameter of the third hole 45c (the inner diameter of the large-diameter portion 42) was 2.5 mm. The terminal-coating layer 58 including the bottom coating layer 58a and the side coating layer 58b was formed on each feeding terminal 40. The terminal-coating layer 58 was formed as follows. First, each feeding terminal 40 was ultrasonically cleaned in acetone for 5 minutes and then in pure water for 10 minutes, and nitrogen was blown at 120° C. for 10 minutes to remove water on the surface to thereby dry the surface. Next, the terminal-coating layer 58 formed of electroless Ni plating with a thickness of 1 μm was formed. The side coating layer 58b was formed so as to cover a region extending 3 mm from an edge of the small-diameter portion 41 on the joint surface 43 side toward the side opposite to the joint surface 43.

Then, in the step (c), the ceramic substrate 12, the guard rings 60, the feeding terminals 40, the brazing material 56, and the powder 54 that were arranged in the step (b) were placed in a firing furnace and heated to form joint layers 50, whereby the feeding terminals 40 were joined to the ceramic substrate 12. The heating conditions were a temperature of 700° C.±20° C., a holding time of 10 minutes, and a degree of vacuum of $5\times10^{-5}$ Torr or lower. In the firing furnace, each feeding terminal 40 was pressed against the ceramic substrate 12 using a weight of 125 gf.

After the joining in the step (c), the joined body was removed from the firing furnace. Then the guard rings 60 were removed, and air was blown on the joined body to remove excess powder 54. The joined body in Example 1 was thereby produced.

Comparative Example 1

A joined body in Comparative Example 1 was produced in the same manner as in Example 1 except that the feeding terminals 40 were joined to the ceramic substrate 12 using the brazing material 56 without using the guard rings 60 and the powder 54.

The joint strength of the joined body in Example 1 was measured by applying force so as to separate the ceramic substrate 12 and the feeding terminals 40 from each other in the direction of the force. The joint strength was 30 kgf, and this is a practically acceptable value for the electrostatic chuck 10. The joint strength was measured using a tensile strength tester (Autograph, manufactured by Shimadzu Corporation).

The joined bodies in Example 1 and Comparative Example 1 were heated using an external heater from room temperature to 100° C. at a rate of 5° C./second and then allowed to naturally cool to room temperature. This process was repeated 1,000 times. Then, for each of the joined bodies, the presence or absence of cracking was checked. No cracking was found in the joined body in Example 1, but cracking was found in the ceramic substrate 12 in the joined body in Comparative Example 1.

Comparative Example 2

An attempt was made to produce a joined body in the same manner as in Example 1 except that the guard rings 60 were not used. However, the powder 54 spread over the ceramic substrate 12, and the feeding terminals 40 were not joined to the ceramic substrate 12 even after heating in the firing furnace.

Examples 2 to 9

Joined bodies in Examples 2 to 9 were produced in the same manner as in Example 1 except that the small-diameter portion 41 and the large-diameter portion 42 in each of the feeding terminals 40 had the same diameter (5.0 mm), that the inner diameter of the through holes 61 of the guard rings 60 was adjusted such that the clearance between the inner diameter of the through holes 61 and the outer diameter of the feeding terminals 40 was one of the values shown in Table 1, and that the amount of the brazing material 56 was adjusted such that the space between each through hole 61 and a corresponding feeding terminal 40 was filled with a joint layer 50a, as shown in FIG. 19. For each of Examples 2 to 9, the rupture strength of the as-produced joined body and the presence or absence of cracking in the as-produced joined body were measured as initial properties. The rupture strength of the joined body and the presence or absence of cracking were measured also after a thermal cycle test. The thermal cycle test was performed as follows. The joined bodies in Examples 2 to 9 were heated using an external heater from room temperature to 100° C. at a rate of 5° C./second and then allowed to naturally cool to room temperature. This process was repeated 1,000 times. A plurality of joined bodies were produced for each of the Examples, and the measurement of the initial properties and the measurement after the thermal cycle test were performed using different joined bodies.

For each of Examples 2 to 9, the clearance between the inner diameter of the through holes 61 of the guard rings 60 and the outer diameter of the feeding terminals 40 during production, the rupture strength of the as-produced joined body, the presence or absence of cracking in the as-produced joined body, the rupture strength of the joined body after the thermal cycle test, and the presence or absence of cracking in the joined body after the thermal cycle test are summarized in Table 1. The meaning of the indices for cracking in Table 1 is as follows. A: No cracking was found. B: Cracking was found, but the degree of cracking was small, and the cracking had no influence on the joining properties. Examples 2 to 9 did not include any Example rated C: Cracking having an influence on the joining properties was found.

TABLE 1

|  | Clearance [mm] | Initial Property | | After Thermal Cycle Test | |
| --- | --- | --- | --- | --- | --- |
|  |  | Strength [kgf] | Cracking | Strength [kgf] | Cracking |
| Example 2 | 0.10 | 41 | A | 40 | A |
| Example 3 | 0.20 | 40 | A | 40 | A |
| Example 4 | 0.30 | 41 | A | 42 | A |
| Example 5 | 0.50 | 39 | A | 43 | A |
| Example 6 | 0.80 | 40 | A | 41 | A |
| Example 7 | 1.00 | 39 | A | 38 | A |
| Example 8 | 1.50 | 41 | A | 22 | B |
| Example 9 | 2.00 | 27 | B | 15 | B |

As clear from Table 1, in Examples 2 to 7 in which the clearance between the inner diameter of the through holes 61 of the guard rings 60 and the outer diameter of the feeding terminals 40 was 1 mm or less, the initial rupture strength and the rupture strength after the thermal cycles tended to be higher than those in Examples 8 and 9 in which the clearance exceeded 1 mm. In Examples 2 to 7, both the initial rupture strength and the rupture strength after the thermal cycles were 30 kgf or more, and these joined bodies were sufficiently acceptable for use as electrostatic chucks 10. In Examples 8 and 9, slight cracking was found. However, in Examples 2 to 7, no cracking was found both before and after the thermal cycles. This may be because of the following reason. When the clearance is 1 mm or less, a region of each joint layer 50 in which the ratio of the brazing material 56 is high and which is formed so as to climb up the side surface of a corresponding feeding terminal 40 (the joint layer 50a in FIG. 19) has a small radial thickness. Therefore, the occurrence of cracking due to the difference in thermal expansion between the brazing material 56 and the ceramic base 12 can be suppressed.

The present invention is not limited to the above-described Examples 1 to 9.

The present application claims priority from Japanese Patent Application No. 2014-044945 filed on Mar. 7, 2014, the entire contents of which are incorporated herein by reference.

What is claimed is:

1. A method for manufacturing a joined body in which a joint surface of a first member made of a ceramic and a joint surface of a second member made of a metal are joined to each other through a joint layer, the second member comprises a vent hole including a first opening on the joint surface of the second member and a second opening in communication with the first opening, the method comprising the steps of:
  (a) disposing an insertion jig having a through hole into which the second member is insertable on the first member such that one of openings of the through hole is covered with the joint surface of the first member;
  (b) disposing, inside the through hole, a brazing material including a metal having a larger thermal expansion coefficient than the first member, a powder of a material having a smaller thermal expansion coefficient than the brazing material, and the second member; and (c) fusing the brazing material to impregnate the powder with the brazing material to thereby form a joint layer including the brazing material and the powder, whereby the joint surface of the first member and the joint surface of the second member are joined to each other through the joint layer.

2. The method for manufacturing a joined body according to claim 1,
wherein in the step (b), a clearance is 1 mm or less, the clearance being the difference between the inner diameter of the through hole and the outer diameter of a side surface of the second member that is a surface thereof facing the inner circumferential surface of the through hole.

3. The method for manufacturing a joined body according to claim 1,
wherein the insertion jig includes carbon.

4. The method for manufacturing a joined body according to claim 1,
wherein the powder is made of the same ceramic material as the first member.

5. The method for manufacturing a joined body according to claim 1,
wherein in the step (b), at least one of (i) the joint surface of the first member is coated in advance with a material having higher wettability to the brazing material than the joint surface of the first member, (ii) the joint surface of the second member is coated in advance with a material having higher wettability to the brazing material than the joint surface of the second member, and (iii) the powder is coated in advance with a material having higher wettability to the brazing material than the powder.

6. The method for manufacturing a joined body according to claim 1,
wherein the first member does not have a portion rising from the joint surface thereof.

* * * * *